United States Patent [19]

Black et al.

[11] Patent Number: 4,580,699

[45] Date of Patent: Apr. 8, 1986

[54] PROPORTIONER

[75] Inventors: Thomas L. Black, Howell; Steven S. Kendall, Fowlerville, both of Mich.

[73] Assignee: Chem-Trend Incorporated, Howell, Mich.

[21] Appl. No.: 563,717

[22] Filed: Dec. 20, 1983

[51] Int. Cl.⁴ .............................................. B67D 5/08
[52] U.S. Cl. ..................... 222/64; 222/638; 222/129.3; 222/135; 222/145; 222/309; 137/208; 137/256
[58] Field of Search ....................... 222/43, 56, 61, 64, 222/66, 129.3, 133, 135, 145, 250, 309, 52, 14, 15, 16, 21, 37, 638; 137/256, 391, 206, 208, 209; 141/248; 92/13, 13.5, 13.7, 13.8

[56] References Cited

U.S. PATENT DOCUMENTS

| | | | |
|---|---|---|---|
| 3,052,379 | 9/1962 | Raspante | 222/250 |
| 3,486,297 | 12/1969 | Eisinga et al. | 137/208 X |
| 3,799,402 | 3/1974 | Meister et al. | 222/129.2 |
| 4,213,544 | 7/1980 | Pandolfi | 222/250 |
| 4,284,210 | 8/1981 | Horak | 222/14 |
| 4,320,775 | 3/1982 | Stirling et al. | 137/256 X |

*Primary Examiner*—Joseph J. Rolla
*Assistant Examiner*—Kevin P. Shaver
*Attorney, Agent, or Firm*—Stephenson & Boller

[57] ABSTRACT

A proportioning system for creating admixture from diluent and concentrate comprises accumulators which are alternatively repetitively recharged so that one is always on-line. Recharging is controlled by a fluid system including a piston assembly for injecting a measured charge of concentrate into an accumulator being recharged. Diluent is introduced by opening and closing a valve from the diluent supply with the recharging being activated and terminated by level sensing switches associated with the accumulators. Electrical control circuitry and a stroke adjustment mechanism for the piston assembly are also disclosed.

13 Claims, 3 Drawing Figures

PROPORTIONER

BACKGROUND AND SUMMARY OF THE INVENTION

This invention relates to a proportioner, particularly to a proportioner for mixing a concentrate with a diluent and delivering the proportioned admixture to a utilization system.

Manufacturing procedures often require the mixing of a concentrate with a liquid such as water to form an admixture which is used in the manufacturing processes. One example of a system using this type of procedure is a die lubricating system in which die lubricant is delivered from a central system to individual die casting machines. The die lubricant is delivered to the manufacturing plant in concentrate form and is diluted on site in a desired proportion with a diluent such as water or other liquid. The dilution is delivered through an in-plant delivery system to the individual machines.

One advantage of course in shipping concentrate and diluting it on site is that shipping costs are considerably lower. It is however necessary for the plant to have apparatus for mixing the concentrate in a desired proportion with diluent. It is also important that the concentrate be accurately proportioned with the diluent.

U.S. Pat. No. 4,186,769, issued Feb. 5, 1980, commonly assigned, relates to a liquid mixing and delivering apparatus which is of this general type. In the apparatus disclosed in that patent the concentrate and diluent are mixed in proportion by metering pumps, and the admixture is accumulated in an accumulator. Control of metering pump speeds is intended to yield the desired proportioning. The concentration may be varied by speed adjustments.

U.S. Pat. No. 3,799,402 also relates to an apparatus for preparing an admixture by dilution of a concentrate. This type of a system may be considered as a double acting piston type system having one double acting piston for metering the diluent, i.e. the water, and a second double acting piston for the concentrate. The pistons' sizes and strokes determine the proportioning.

The present invention is directed to a new and improved proportioner of the type for preparing an admixture by the dilution of a concentrate. The present invention offers a number of advantages including the following: relatively high flow rates for delivery; no pressure limitations on delivery except those which are imposed by the equipment used; a limited number of moving parts; accumulation of a limited quantity of admixture while assuring the availability of supply for all demands for which the system is designed.

Briefly, the present invention in its preferred embodiment as disclosed in this application comprises a pair of accumulators which are alternately repetitively recharged so that one of the two accumulators is always on-line for delivery of admixture to the utilization system and during the time that one of the two accumulators is online, the other accumulator is recharged. Each accumulator can be rapidly recharged in accurate proportion before the contents of the other accumulator have been exhausted. Hence, continuous availability of admixture is assured, but with only a limited accumulation of admixture at any given time.

The invention also comprises a means for conveniently adjusting the amount of concentrate which is introduced into each recharging of an accumulator so that an accurate proportion of concentrate is assured for a given volume of diluent. The volume of diluent is determined by the size of an accumulator and the proportion is set by appropriate adjustment of the amount of concentrate delivered per each recharging of an accumulator. The concentrate is delivered to an accumulator by means of a piston in which the piston is precharged with a given volume of concentrate prior to the recharging of an accumulator. When an accumulator is to be recharged, the piston is operated to force the concentrate into the accumulator and at the same time the diluent is introduced by merely opening a valve and allowing the diluent to flow into the accumulator. Hence, it is unnecessary to meter the amount of diluent since the amount of diluent will be determined by the volume of the accumulator. In this regard the valve is shut off when the accumulator has been filled to a desired fill level as sensed by a level switch.

Associated with the concentrate delivery piston is a stroke adjusting mechanism which provides an effective means for adjusting the piston stroke and hence the volume of concentrate per recharging of an accumulator. The mechanism may be conveniently adjusted manually by means of a rotary handle.

An electrical circuit is associated with the system to produce the desired operating sequence of its various component parts. The electrical circuit contains interlocking features to assure the desired sequence of operation and to warn against the occurrence of undesired activities.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
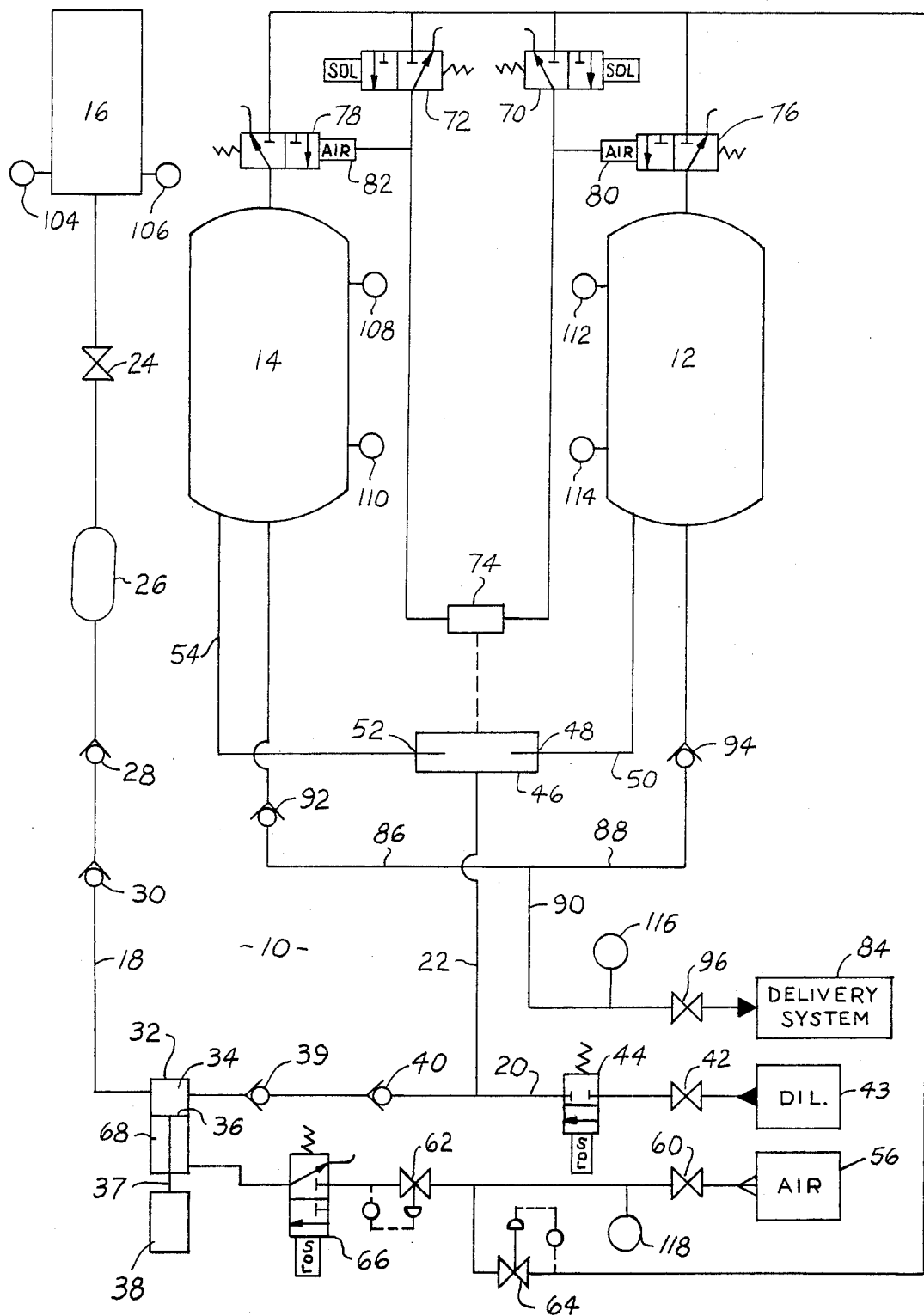
FIG. 1 is a schematic fluid diagram illustrating a proportioning system embodying principles of the present invention.

FIG. 1 illustrates a fluid circuit of a proportioner 10 embodying principles of the present invention. It comprises a first and second accumulator 12 and 14 respectively, which are alternately, repetitively recharged with a mixture of a concentrate and a diluent. The concentrate is contained within a reservoir 16 and is delivered selectively to the accumulators 12 and 14 through a circuit branch designated by the general reference numeral 18. The diluent is supplied directly from a source under pressure. In the example disclosed herein the concentrate is a die lubricant, the diluent is water. The water is supplied via a circuit branch 20. The two circuit branches 18 and 20 have confluence in the circuit branch designated by the reference numeral 22.

Circuit branch 18 has a connection to reservoir 16 near the reservoir's bottom. This branch includes a shut off valve 24, a strainer or filter 26, and a pair of check valves 28 and 30 connected in series as illustrated. The second check valve 30 connects to a piston assembly 32.

Piston assembly 32 comprises a pumping chamber 34 which is acted upon by a movable piston element 36. A rod 37 extends from piston element 36 externally of piston assembly 32. Piston rod 37 is utilized in conjunction with a stroke adjusting mechanism 38 to be subsequently described in connection with the description of FIG. 3, for the purpose of controlling the stroke of piston element 36, and hence the amount of the charge of concentrate, which is delivered for each recharging of one of the accumulators 12, 14.

Circuit branch 18 includes a further pair of check valves 39 and 40 in series leading from piston assembly 32 to confluence with circuit branch 20 to form circuit branch 22.

Circuit branch 20 comprises a shut off valve 42 and an electrically actuated solenoid valve 44 connected in series between the diluent supply 43 and the confluence with branch 18 to form branch 22.

Branch 22 terminates at the inlet of a two-way 3 position valve 46 which has one of its two outlets 48 connecting via a branch 50 to the bottom of accumulator 12 and its other outlet 52 connecting via a branch 54 to the bottom of accumulator 14.

The fluid system also utilizes a compressed air supply where compressed air is obtained from a suitable pneumatic power source, such as plant air 56. Air is used with both piston assembly 32 and pneumatic circuits associated with accumulators 12, 14 and valve 46. Plant air is conducted through a shut off valve 60 to a pair of pressure regulators 62 and 64 respectively. Pressure regulator 62 is associated with piston assembly 32 while pressure regulator 64 is associated with the pneumatic circuits associated with accumulators 12, 14 and valve 46. The pressure regulators are adjustable to provide desired air pressures for the respective portions of the system.

Pressure regulator 62 is connected through an electrically actuated solenoid valve 66 to a chamber 68 within piston assembly 32 on the opposite side of piston element 36 from chamber 34.

Pressure regulator 64 is connected to a pair of electrically actuated solenoid valves 70 and 72 which are respectively associated with accumulators 12 and 14. Valves 70 and 72 are in turn respectively coupled through respective lines to opposite sides of an actuator 74 associated with valve 46.

Additional valves 76 and 78 are also respectively associated with accumulators 12 and 14. These valves are pilot operated from valves 70 and 72 respectively by means of respective pilots 80 and 82. Pressure regulator 64 directly connects to the respective inlets of the two valves 76, 78. The respective outlets of the two valves connect to the head spaces of the respective accumulators 12 and 14.

Each accumulator 12, 14 is a gas-over-liquid type device. The admixture is accumulated in each accumulator and the head space of each accumulator is selectively pressurized and vented depending upon whether it is on-line delivering admixture to the utilization system or whether it is being recharged.

Each accumulator has its bottom connected with the utilization system including one or more work stations 84 by respective branches 86 and 88 which have confluence at branch 90. The utilization system 84 of the example is an in-plant die lubricant delivery system to a plurality of die casting machines. Each branch 86, 88 contains a corresponding check valve 92, 94. The admixture is delivered to utilization system 84 through a shut off valve 96.

The circuit of FIG. 1 illustrates additional components as follows: level switches 104, 106 associated with reservoir 16; level switches 108, 110 associated with accumulator 14; level switches 112, 114 associated with accumulator 12; and pressure switches 116, 118 associated with plant air 56 and utilization system 84 respectively.

Shut off valves 24, 42, 60 and 96 are ball type valves or gate type valves, and when the proportioner is in use, they are all open.

Valve 46 is selectively operable to two positions. One of these two positions communicates branch 22 with branch 50 to the exclusion of branch 54, and the other position communicates branch 22 with branch 54 to the exclusion of branch 50. Valve 46 is selectively operated via actuator 74 to alternatively repetitively communicate accumulators 12 and 14 to branch 22.

Check valves 28 and 30 are arranged to permit flow only in the direction from reservoir 16 to piston assembly 32 and not in the opposite direction. The use of two check valves, rather than merely a single one, is preferred as an extra precaution against reverse leakage. Check valves 39 and 40 are arranged to permit flow only from piston assembly 32 toward branch 22 and not in the opposite direction. Once again, the use of two check valves, rather than only one, is preferred as an extra precaution against reverse leakage.

The arrangement of check valves 92 and 94 permits flow from the on-line accumulator to utilization system 84 while preventing flow into the off-line accumulator.

The general operation of the fluid circuit of FIG. 1 will now be explained. Let it be assumed initially that one of the two accumulators, say accumulator 12, is presently in on-line use so that admixture is permitted to flow from accumulator 12, through check valve 94 along branches 88 and 90 and through the open valve 96 to utilization system 84. In this condition, air pressure is being delivered via regulator 64 and valve 76 to the headspace of accumulator 12. As the utilization system calls for admixture, the level in accumulator 12 gradually drops. When the level has dropped to a certain point near the bottom, level switch 114 is actuated. The actuation of level switch 114 causes the following events to occur.

Accumulator 12 is immediately removed from on-line operation while accumulator 14, which is fully recharged, is placed on-line. Valves 70 and 72 are operated to cause actuator 74 to operate valve 46 to block branch 54 and open branch 50. Valves 70 and 72 also operate pilots 80 and 82 causing valves 76 and 78 to operate causing the headspace of accumulator 12 to be vented and that of accumulator 14 to be pressurized. Admixture from accumulator 14 now can flow through check valve 92 of branch 86 and through branch 90 and valve 96 to utilization system 84 as demand occurs. Accumulator 14 continues to remain on-line until its admixture drops to a level sensed by level switch 110 which is analogous to level switch 114 of accumulator 12. When level switch 110 is actuated, accumulator 14 is placed offline while accumulator 12 is again placed on-line, the latter accumulator having fully recharged while the former was on-line. The switching of accumulator 14 to off-line operation and accumulator 12 to on-line operation occurs by operating valves 70 and 72 to cause actuator 74 to operate valve 46 to block branch 50 and open branch 54. Valves 70 and 72 also operate pilots 80 and 82 causing valves 76 and 78 to operate causing the headspace of accumulator 14 to be vented and that of accumulator 12 to be pressurized.

While accumulator 14 is on-line, the recharging of accumulator 12 takes place in the following manner. The actuation of level switch 114 has caused the headspace of accumulator 12 to be vented. The operation of level switch 114 has also caused valve 44 to be opened and valve 66 to be actuated. Valve 66 allows pressurized air from the pressure regulator 62 to enter chamber 68 of the piston assembly 32 causing it to be operated. The operation of piston assembly 32 causes a charge of concentrate to be delivered from chamber 34 and injected along with water flowing through valve 44 into accumulator 12. Confluence of the water and concentrate takes place as they pass through branch 22, valve 46 and branch 50 into accumulator 12. The accumulator continues to fill until level switch 112 is actuated to indicate that the tank has been fully recharged with admixture.

Operation of level switch 112 causes water valve 44 to close. When water valve 44 is closed, the full charge of concentrate from piston assembly 32 has already been injected and therefore accumulator 12 contains an admixture of correct proportion when the recharging is terminated by actuation of switch 112. Accumulator 12 is therefore ready to be placed on-line when switch 110 of accumulator 14 is again actuated.

Level switch 108 of accumulator 14 is actuated when that accumulator has been recharged to its full level, and the recharging of accumulator 14 occurs in an analogous manner to the recharging of accumulator 12 which has just been described.

Correct proportioning for each recharging operation is obtained because piston assembly 32 is operable to deliver one measured charge of concentrate each time that one of the accumulators is being recharged. The level switches of the accumulators control water valve 44 so that it is unnecessary to otherwise meter or measure the flow of water into the accumulator which is being recharged.

Once the piston assembly has injected one measured charge of concentrate, the piston assembly is itself recharged with a new charge of concentrate. The recharging of piston assembly 32 is accomplished in the following manner.

Let it be assumed that the piston assembly has been operated to a condition in which it has just injected a charge of concentrate into an accumulator. At this point the volume of chamber 34 is at its minimum. Valve 66 is deactuated, venting the air from chamber 68 of piston assembly 32, allowing stroke adjusting mechanism 38 to operate the piston element 36. Piston element 36 is operated to enlarge the volume of chamber 34 and this creates a suction within the chamber which is effective to draw concentrate from reservoir 16 through branch 18 and into chamber 34. By stopping piston element 36 at a given position, a measured charge of concentrate in chamber 34 is determined. When the charge is to be delivered into one of the accumulators, piston element 36 is operated in the opposite direction to expel the charge from chamber 34. Because of the arrangement of check valves 28, 30, 39 and 40, the charge which is expelled from chamber 34 travels through check valves 39 and 40 into branch 22 and on to the particular accumulator which is being recharged.

Having therefore described generally the operation of the fluid circuit of FIG. 1, it is appropriate to consider more specific details of the manner of its operation, and these will be explained with additional reference to FIGS. 2 and 3.

Figure 3:
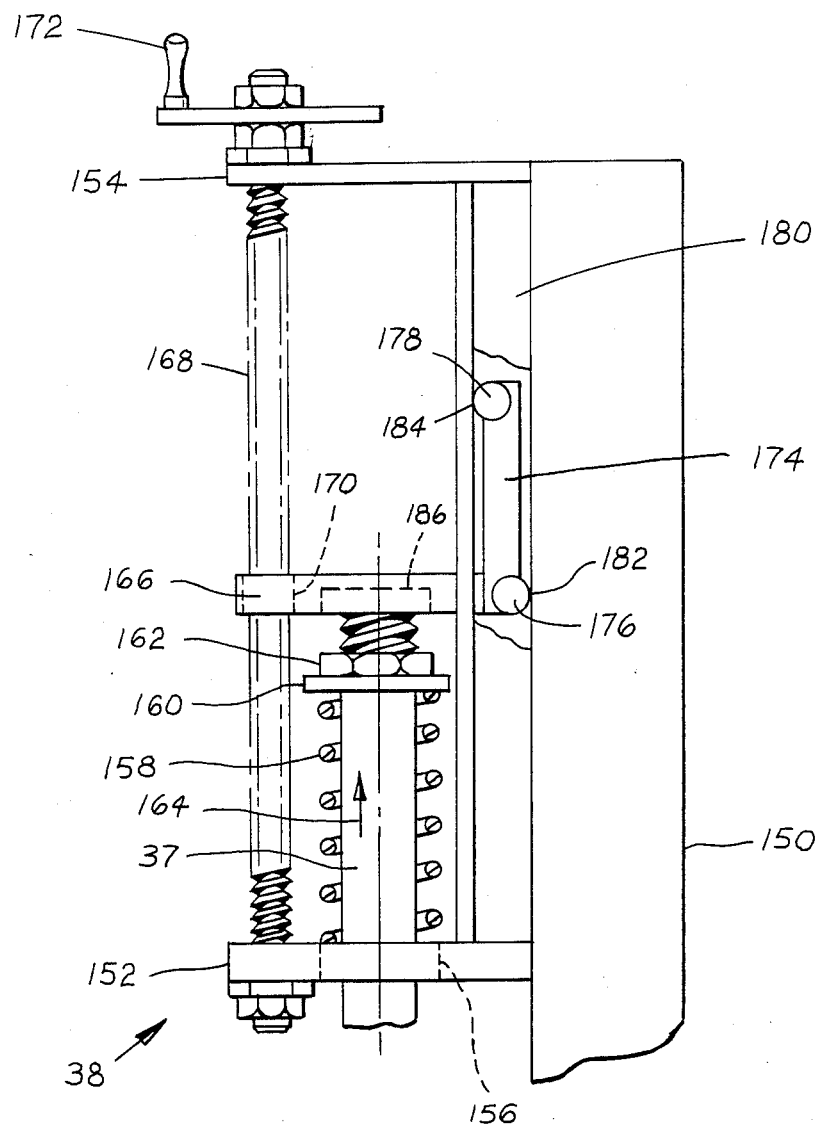
FIG. 3 is a longitudinal view illustrating details of the mechanism for performing the stroke adjustment of the piston which delivers concentrate.

FIG. 3 illustrates details of stroke adjusting mechanism 38. The stroke adjusting mechanism is arranged generally coaxial with piston assembly 32 at the end of rod 37 on the exterior of the piston assembly. Although FIG. 1 shows mechanism 38 below assembly 32, the showing is for convenience of the schematic, and the preferred construction is as shown in FIG. 3 where rod 37 points up and mechanism 38 is above assembly 32.

The stroke adjusting mechanism comprises a frame 150 mounted in fixed relation to the mounting of the piston assembly. Frame 150 comprises a pair of axially spaced supports 152, 154. A hole 156 is provided in support 152 and the end of rod 37 passes through this hole. A helical compression spring 158 is disposed around the end of rod 37. The extreme distal end of rod 37 is threaded, and a washer 160 and nut 162 are placed onto the end of the shaft such that spring 158 is partially compressed between member 152 and washer 160. In this way spring 158 is effective to urge rod 37 in the direction of extension as represented by arrow 164. In other words it biases piston element 36 downwardly as viewed in FIG. 1.

The stroke adjusting mechanism further comprises a stop 166 for piston rod 37. Stop 166 is disposed transversely to the direction of rod travel and is positionable axially along frame 150 by means of a screw and nut 168, 170. Screw 168 extends parallel to rod 37 and is journaled for rotation on supports 152 and 154. Nut 170 is provided in stop 166 radially outwardly of the piston rod. An operating crank 172 is affixed to the upper end of screw 168 and may be manually operated to rotate the screw.

Diametrically opposite nut 170 relative to the piston rod, stop 166 is attached to a carriage 174. Carriage 174 contains a pair of spaced apart wheels 176, 178 and the wheels ride within a guide 180 which extends parallel to screw 168. It will be observed that wheels 176 and 178 contact and roll against opposite track surfaces of the guide as indicated by the numerals 182 and 184 respectively.

With this arrangement the rotation of screw 168 by crank 172 is effective to axially position stop 166 relative to frame 150. The arrangement is advantageous in that it is compact, readily adapted to the piston assembly, readily operated and provides an adjustable stop which can be accurately positioned without binding.

It will be appreciated that the setting of the axial position of stop 166 establishes the limit of extension of piston element 36. This in turn defines the volume of the charge of concentrate which is drawn into chamber 34 each time that the piston assembly is recharged. In other words, by appropriately positioning stop 166, the charge of concentrate which is used for each recharging of an accumulator may be accurately set. By providing a suitable lead for the screw thread and nut, the abutment of the piston rod end with the stop will be ineffective to change the adjustment position of the stop once it has been set.

Figure 2:
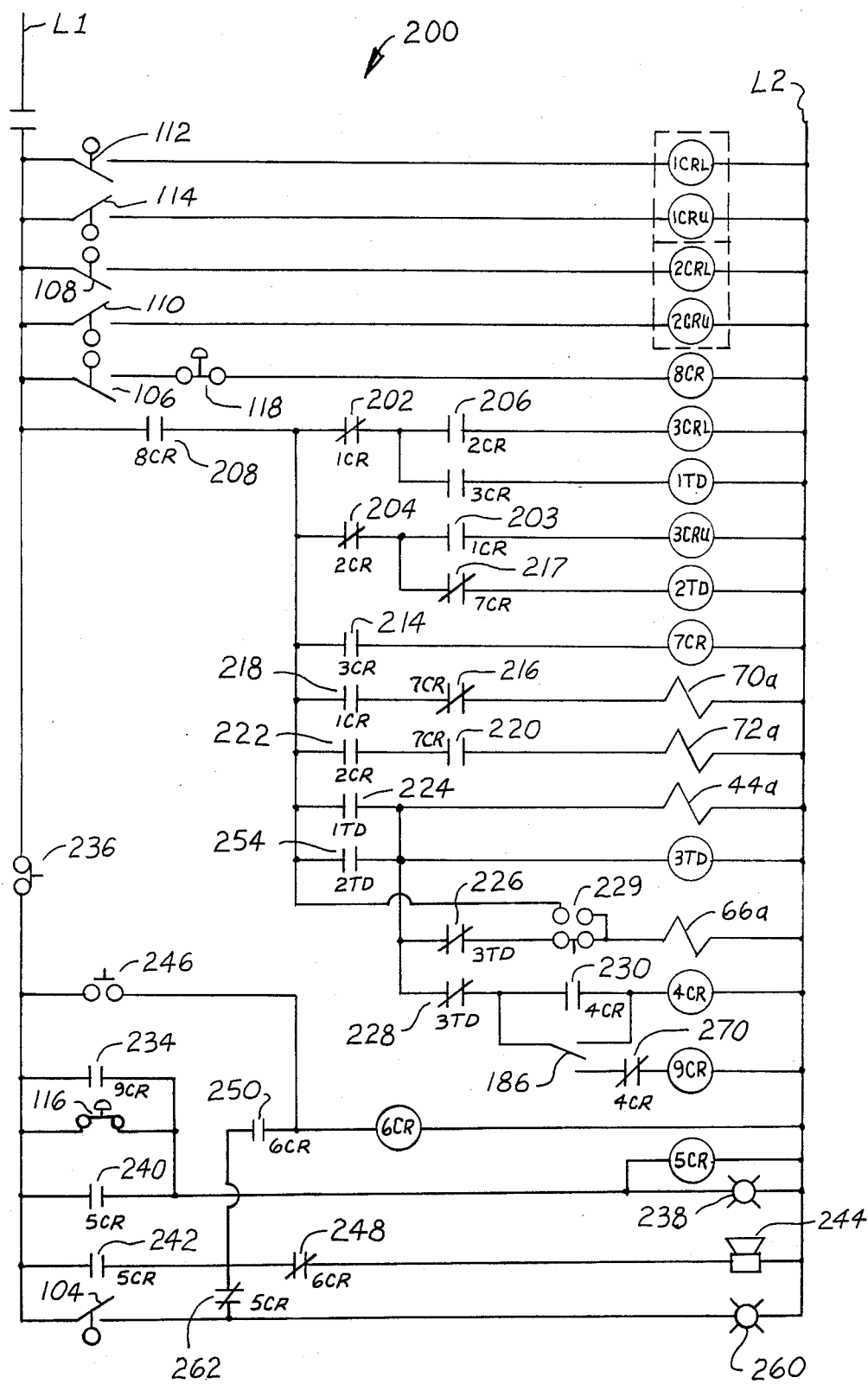
FIG. 2 is an electrical schematic diagram of an electrical control circuit associated with the system of FIG. 1.

Also associated with stop 166 is a switch 186 which is shown schematically in FIG. 2. The switch may be mounted in any suitable manner to sense the abutment of the rod end with stop 166. This switch is used to provide electrical signals in association with the electrical control shown in FIG. 2 as will become apparent in the description of FIG. 2 which will now be given.

FIG. 2 shows an electrical control circuit 200 which is associated with the fluid circuit of FIG. 1 to perform the desired sequence of operations. The illustrated electrical control circuit is constructed using conventionally available industrial electrical components. Power is supplied via mains L1 and L2. The level switches of FIG. 1 appear schematically in FIG. 2 and are identified by like reference numerals. The pressure switches 116 and 118 are also shown schematically in FIG. 2.

Valves 44, 66, 70 and 72 are electrically-actuated, and the solenoid actuators of these valves are shown in FIG. 2 and identified by the respective numerals 44a, 66a, 70a and 72a.

Circuit 200 further includes conventional relays along with additional switches, lamps and other conventional electrical devices. The relays have various normally open and normally closed relay contacts and these are identified in the drawing using a standard convention in industrial electrical circuits.

Contacts 208 are associated with a relay 8CR whose coil is in series with the two switches 106, 118. During regular operation, contacts 208 are closed to allow the accumulators to be alternately repetitively recharged. In the event that either the concentrate level in reservoir 16 drops below that of switch 106 or the air pressure as sensed by pressure switch 118 drops below a certain level relay 8CR is deenergized, and this will open contacts 208 to prevent accumulator recharging.

For purposes of describing the circuit operation, let it be assumed that the level of admixture in accumulator 12 has just dropped to cause actuation of level switch 114. Switch 114 is associated with the unlatch coil 1CRU of a relay 1CR which has separate latch and unlatch coils. The actuation of switch 114 causes relay 1CR to unlatch. Relay 1CR comprises contacts 202, 203 and 218. The unlatching of relay 1CR causes its normally open and normally closed contacts to revert to their respective normally open and normally closed states.

Based upon the previous description of the fluid circuit of FIG. 1, it will be appreciated that at the time switch 114 was actuated, the other accumulator 14 was fully recharged. Because switch 108 was actuated when accumulator 14 became fully recharged, a second relay 2CR is in its latched condition at the time that the level switch 114 of accumulator 12 is actuated to unlatch relay 1CR, and consequently, the normally closed contacts 204 of relay 2CR are open and its normally open contacts 206, and 222 are closed. The net effect therefore, when switch 114 is closed is to cause a complete circuit through contacts 208, 202 and 206 to operate the latching coil 3CRL of another relay 3CR. Relay 3CR has contacts 210, and 214, both of which are normally open. The latching of relay 3CR causes the normally open contacts to close. Hence, contacts 214 are effective to energize a single coil relay 7CR which has normally closed contacts 216, and 217 and normally open contacts 220. This causes the normally open contacts to close and the normally closed contacts to open. Contacts 216 and 218 are associated with solenoid 70a of valve 70. Contacts 220 and 222 are associated with solenoid 72a of valve 72. The opening of contacts 218 and 216 are effective to deenergize the solenoid 70a. And since contacts 222 are closed, the closing of contacts 220 is effective to energize the solenoid 77a. The unlatching of relay CR1 and the energization of relay 7CR is therefore effective to switch the energization of solenoids 70a and 72a such that solenoid 72a becomes energized and solenoid 70a becomes deenergized. The consequence of this is to vent the headspace of accumulator 12 while pressurizing the headspace of accumulator 14. It also is effective to operate valve 46 to block branch 54 and open branch 50. Accumulator 14 is now on-line and accumulator 12 off-line.

The latching of relay 3CR was also effective to close contacts 210. The closure of contacts 210 energizes a time delay relay 1TD whose contacts 224 are associated with solenoid 44a. The delay takes place upon energization whereby the contacts are operated to closed condition in a slightly delayed relationship to the venting of the headspace of accumulator 12. Thus, water valve 44 is opened shortly after accumulator 12 has been vented to cause the water to flow into the accumulator.

At the same time that the water valve solenoid 44a was energized by the closure of contacts 224, a relay 3TD was also energized. Contacts 226 and 228 of relay 3TD are normally closed and therefore open in delayed relationship to energization of the coil of relay 3TD. Contacts 226 control solenoid 66a of valve 66. Contacts 228 are associated with a full-charge-of-concentrate assurance circuit. The full-charge-of-concentrate assurance circuit will be described later on.

When contacts 224 close, a circuit is immediately completed through contacts 226 and a switch 229 to energize solenoid 66a. Valve 66 is therefore immediately operated to pressurize chamber 68 of the piston assembly and stroke the piston so as to inject the charge of concentrate in chamber 34 into accumulator 12.

The delay of relay 3TD is long enough to allow the full charge of concentrate to be injected into the accumulator. For example, 10 seconds can be a typical delay. When the delay time has elapsed, contacts 226 open to deenergize solenoid 66a. With valve 66 now no longer actuated, the air pressure is removed from the piston assembly and the stroke adjusting mechanism is effective to return stroke the piston by the action of spring 158 causing the piston assembly to be recharged with a new charge of concentrate from reservoir 16.

The purpose of switch 186 is to assure that the piston has been fully return stroked by abutment of rod 37 with stop 166 and assure that a full charge of concentrate is drawn into the piston assembly during each recharging. Hence, when the piston rod actuates switch 186 concurrent with its abutment of stop 166, a circuit is completed from contacts 228 to the coil of a relay 4CR. Since the piston rod will be continuously actuating switch 186 once the piston assembly has been recharged, the closure of relay contacts 224 is effective to energize the coil of relay 4CR through contacts 228 at the same time that solenoid 66a is operated to advance stroke the piston for injecting the concentrate into the accumulator. As the piston is advance stroked, switch 186 is released but contacts 230 of relay 4CR have already been energized to thereby seal relay 4CR energized through contacts 228. Relay 4CR being energized holds open contacts 270 preventing relay 9CR from being energized and thereby activating the alarm circuit. Relay 4CR is deenergized at the end of the delay by virtue of the opening of contacts 228, and will remain so until switch 186 is again actuated.

The circuit arrangement associated with the coils of relay 4CR and 9CR is a logic circuit which assures that a full charge of concentrate has been drawn into the piston assembly for use in subsequently recharging an accumulator. A full charge measurement of concentrate is detected by the abutment of the piston rod with the adjustable stop as sensed by the actuation of switch 186. If switch 186 has not been actuated, then relay 4CR cannot be energized when contacts 224 of relay 1TD close. Instead relay 9CR is energized, through contacts 270, and it has a set of contacts 234 associated with an alarm circuit.

Closure of contacts 234 energizes the coil of a relay 5CR. A system fault lamp 238 is also lighted. The energization of relay 5CR causes the relay coil to be sealed energized through a set of its own contacts 240. Another set of contacts 242 of relay 5CR are also closed to sound a horn 244 through a set of contacts 248.

Horn 244 may be silenced by operating a switch 246. Operation of switch 246 energizes the coil of a relay 6CR, and the normally closed contacts 248 open to deenergize the horn. The coil of relay 6CR remains sealed because the contacts 250 close when the relay is energized and hence it is sealed through contacts 242 and 250. The two relays 5CR, 6CR are deenergized by operating a reset switch 236 after the condition which gave rise to the alarm has been corrected. A fault is also given if the dilution pressure deviates from normal as sensed by pressure switch 116.

Accumulator 12 will continue to be recharged until level switch 112 is actuated. The actuation of switch 112 energizes the latch coil of relay 1CR so that the normally open contacts close and the normally closed contacts open. Hence, contacts 202 open and contacts 203 and 218 close. Although contacts 203 close, the normally closed contacts 204 are already open and therefore relay 3CR does not change from its latched condition. Relay 1TD is however deenergized and this causes contacts 224 to open and in turn water valve 44 to close thereby shutting off the flow of water into accumulator 12. Relay 3TD is also deenergized causing the contacts 226 and 228 to revert to their normally closed conditions. The circuit remains in this condition until the admixture level in accumulator 14 drops to actuate switch 110.

The actuation of switch 110 energizes the unlatch coil of relay 2CR. This causes the normally open and normally closed contacts to revert to their normally open and normally closed conditions respectively. Hence, a circuit is now completed through contacts 208, 204 and 203 to energize the unlatch coil of relay 3CR. The unlatching of relay 3CR opens contacts 210 and 214 causing relay 7CR to be deenergized. This in turn causes the normally closed contacts 216 and 217 to revert to normally closed conditions and the normally open contacts 220 to revert to the normally open condition. The operation of contacts 216 and 220 cause solenoid 70a to be energized and solenoid 72a to be deenergized. The reversal in the energization of the two solenoids 70a and 72a is effective now to vent accumulator 14 and to pressurize accumulator 12. It is also effective to shift the valve 46. Now accumulator 12 is on-line and accumulator 14 off-line.

The energization of relay 2TD causes its normally open contacts 254 to close and energize solenoid 44a and relay 3TD. Water valve 44 therefore opens, and valve 66 is operated to apply air pressure to the piston assembly causing the latter to inject the concentrate charge into accumulator 12. When relay 3TD has timed out, the valve 66 is operated to vent piston assembly 32 and allow it to be recharged with a new charge of concentrate from reservoir 16. Recharging of the piston assembly occurs immediately after it has injected a charge into an accumulator and is advantageous because it maintains the piston assembly wet and avoids problems which might occur if it were allowed to remain dry until just before a recharging of an accumulator.

The full recharging of accumulator 14 is indicated by the closure of switch 108 causing relay 2CR to become latched. The latching of relay 2CR closes contacts 206 and 222 to prepare the circuit for the recharging of accumulator 12 when switch 114 is again actuated. It also opens contacts 204 which deenergizes relay 2TD. Deenergizing relay 2TD opens the normally open contacts 254 which shuts the water valve 44 and deenergizes relay 3TD. In this way, it can be seen that the circuit provides a control whereby the alternate recharging of the accumulators takes place.

The other level switch 104 associated with reservoir 16 is connected in the alarm circuit to cause a fault indication to be given and the horn to be sounded if the level in the reservoir drops below a critical level. A special indicator light 260 is also associated with switch 104 to give a visible indication that this particular condition has given rise to the alarm. Another contact 262 of relay 5CR provides power to the horn to the horn silence circuit during this particular condition.

Switch 229 is effective to energize the solenoid 66a causing the piston 36 to operate, thus compressing the spring 158 and taking the tension off the stop 166. With the switch 229 thus held and the spring 158 thus compressed, the stop 166 can be repositioned easily by turning the crank 172. This causes an enrichment of the admixture in the accumulator which is off-line. If the screw 168 and the nut 170 are designed with sufficient strength, and the crank 172 is of sufficient radius, switch 229 would not be required.

Although a preferred embodiment of the invention has been disclosed, it will be appreciated that other embodiments are contemplated within the scope of the invention. For example, it may be deemed desirable for certain concentrates and diluents to include mixers within the accumulators to agitate to admixture.

What is claimed is:

1. Apparatus for mixing two liquids, normally a concentrate and a diluent, to form an admixture of desired concentration and for delivering admixture to work stations, said apparatus comprising a plurality of accumulators for accumulating admixture upstream of the work stations, a reservoir for containing one of said liquids, a supply of the other of said liquids, a delivery line for delivering admixture to the work stations, means for selectively connecting said accumulators on and and off said delivery line, means for recharging an off-line accumulator while another of said accumulators is on-line, said recharging means comprising a piston assembly which is operable to draw a measured charge of said one liquid from said reservoir and to inject the measured charge into a particular off-line accumulator which is being recharged, a valve for controlling the introduction of said other liquid into the particular accumulator being recharged, sensing means for sensing different levels of admixture in said accumulators, and control means for opening said valve to cause said other liquid to flow into the particular accumulator being recharged in response to said sensing means sensing a given low level of admixture in the particular accumulator being recharged, and for closing said valve in response to said sensing means sensing a given high level of admixture in the particular accumulator being recharged, said sensing means defining a known volume in each accumulator between the given high and low levels thereof thereby to attain the desired admixture concentration in a fully recharged accumulator per measured charge of said one liquid injected into the accumulator during recharging.

2. Apparatus as set forth in claim 1 in which there are two accumulators which are repetetively alternatively operated to on-line and off-line connection with the delivery line to the work stations.

3. Apparatus as set forth in claim 2 in which said one liquid is concentrate and said other liquid is diluent.

4. Apparatus as set forth in claim 2 in which said sensing means comprises a pair of level switches for each accumulator.

5. Apparatus as set forth in claim 2 in which said two liquids have a path of confluence to the particular accumulator being recharged.

6. Apparatus as set forth in claim 5 including a further valve in said path of confluence which is selectively operated by said control means to repetitively alternately conduct the confluent flow of the two liquids to the accumulators.

7. Apparatus as set forth in claim 6 including venting and pressurizing means associated with said accumulators and operated by said control means for alternately repetitively pressurizing and venting said accumulators such that the headspace of the accumulator which is online is pressurized and that of the accumulator which is off-line is vented.

8. Apparatus as set forth in claim 2 in which said piston assembly comprises a variable displacement volume chamber into which said one liquid is drawn from said reservoir on a return stroke of the piston and which is effective on the advance stroke of the piston to inject said one liquid into the particular accumulator being recharged, and a stroke adjustment mechanism associated with said piston assembly for adjusting the volume displacement of said chamber to a desired measure for each charge which is injected into the accumulator being recharged.

9. Apparatus as set forth in claim 8 in which said stroke adjustment mechanism comprises a stop, means for selectively positioning said stop axially along the direction of travel of the piston and abutment means on the piston for abutting said stop.

10. Apparatus as set forth in claim 9 in which said control means comprises means for sensing the abutment of said abutment means with said stop and for permitting the injection of a measured charge from said piston assembly during the recharging of a particular accumulator only if abutment of said abutment means with said stop has been sensed.

11. Apparatus as set forth in claim 9 in which said stroke adjusting mechanism comprises means biasing said piston in the direction to draw liquid from said reservoir and including a valve associated with said piston operable to allow a force greater than the bias force acting on the piston to cause the piston to inject a measured charge into the accumulator being recharged.

12. Apparatus as set forth in claim 11 including time delay means by which said first-mentioned valve is operated in a time delay relation to the switching of the particular accumulator being recharged from its on-line to its off-line status.

13. Apparatus as set forth in claim 12 in which said time delay means is also effective for causing venting of the headspace of the accumulator being recharged so that the valve associated with the piston is operated after the headspace of the accumulator being recharged has been vented.

* * * * *